(12) United States Patent
Daigle et al.

(10) Patent No.: US 7,715,378 B1
(45) Date of Patent: May 11, 2010

(54) ERROR NOTIFICATION AND FORCED RETRY IN A DATA STORAGE SYSTEM

(75) Inventors: Michael Daigle, Framingham, MA (US); Gregory Robidoux, Westborough, MA (US); Armen Avakian, Natick, MA (US); Brian K. Campbell, Cedar Park, TX (US); Adam Peltz, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 1018 days.

(21) Appl. No.: 11/325,914

(22) Filed: Jan. 5, 2006

(51) Int. Cl.
*H04L 12/26* (2006.01)
(52) U.S. Cl. .................. 370/386; 370/217; 370/229; 714/17; 714/748
(58) Field of Classification Search .............. 370/217, 370/228, 248, 229, 225; 714/1, E11.015, 714/748–751; 379/221.08, 230; 395/575
See application file for complete search history.

(56) References Cited

U.S. PATENT DOCUMENTS

| | | | | | |
|---|---|---|---|---|---|
| 4,982,187 | A | * | 1/1991 | Goldstein et al. | 340/2.26 |
| 5,084,316 | A | * | 1/1992 | Akao | 428/36.92 |
| 5,084,816 | A | * | 1/1992 | Boese et al. | 714/4 |
| 5,361,249 | A | * | 11/1994 | Monastra et al. | 370/217 |
| 6,584,190 | B1 | * | 6/2003 | Bressler | 379/230 |
| 7,120,846 | B2 | * | 10/2006 | Kawagishi et al. | 714/748 |
| 7,161,901 | B2 | * | 1/2007 | Vu | 370/229 |
| 2006/0277434 | A1 | * | 12/2006 | Tsern et al. | 714/17 |

* cited by examiner

*Primary Examiner*—Robert W Wilson
*Assistant Examiner*—Mohamed Kamara
(74) *Attorney, Agent, or Firm*—Krishnendu Gupta; Scott A. Oullette

(57) ABSTRACT

A data transmission system includes a first data transmission device for receiving commands from a host; a second data transmission device for transmitting commands to a memory device; and a crossbar device for receiving commands from the first data transmission device over a first link and transmitting the commands to the second data transmission device over a second link. The crossbar device includes status logic to detect a command transmission error on the first link from the first data transmission device and transmits a retry command to prompt the first data transmission device to retry the transmission of the command over the first link. The second data transmission device reports a transmission error on the second link to the status logic of the crossbar device and the status logic of the crossbar device transmits the retry command to prompt the first data transmission device to retry the transmission of the command over the first link.

20 Claims, 3 Drawing Sheets

ERROR NOTIFICATION AND FORCED RETRY IN A DATA STORAGE SYSTEM

FIELD OF THE INVENTION

The present invention is generally directed to error notification and forced retry in a data storage system, and more particularly to a method and system in which serial link error in a data transfer between first and second downstream components of the data storage system are identified to a controller as being a link error between the controller and the first downstream component for the purpose of initiating a retry of the data transfer.

BACKGROUND OF THE INVENTION

Network computer systems generally include a plurality of geographically separated or distributed computer nodes that are configured to communicate with each other via, and are interconnected by, one or more network communications media. One conventional type of network computer system includes a network storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network storage subsystem, manufactured and sold by the Assignee of the subject application (hereinafter "Assignee") under the trade name Symmetrix® (hereinafter referred to as the "Assignee's conventional storage system"), includes a plurality of disk mass storage devices configured as one or more redundant arrays of independent (or inexpensive) disks (RAID). The disk devices are controlled by disk controllers (commonly referred to as "back-end" I/O controllers/directors) that may store user data in, and retrieve user data from a shared cache memory resource in the subsystem. A plurality of host controllers (commonly referred to as "front-end" I/O controllers/directors) also may store user data in and retrieve user data from the shared cache memory resource. The disk controllers are coupled to respective disk adapters that, among other things, interface the disk controllers to the disk devices. Similarly, the host controllers are coupled to respective host channel adapters that, among other things, interface the host controllers via channel input/output (I/O) ports to the network communications channels (e.g., SCSI, Enterprise Systems Connection (ESCON), and/or Fibre Channel (FC) based communications channels) that couple the storage subsystem to computer nodes in the computer network external to the subsystem (commonly termed "host" computer nodes or "hosts").

In the Assignee's conventional storage system, the shared cache memory resource may comprise a plurality of memory circuit boards that may be coupled to an electrical backplane in the storage system. The cache memory resource is a semiconductor memory, as distinguished from the disk storage devices also comprised in the Assignee's conventional storage system, and each of the memory boards comprising the cache memory resource may be populated with, among other things, relatively high-speed synchronous dynamic random access memory (SDRAM) integrated circuit (IC) devices for storing the user data. The shared cache memory resource may be segmented into a multiplicity of cache memory regions. Each of the regions may, in turn, be segmented into a plurality of memory segments.

An exemplary data storage system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention (hereinafter, the "'939 patent").

As described in the '939 patent, the interface may also include, in addition to the host computer/server controllers (or directors) and disk controllers (or directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

The host computer/server controllers, disk controllers and cache memory are interconnected through a backplane printed circuit board. More particularly, disk controllers are mounted on disk controller printed circuit boards. The host computer/server controllers are mounted on host computer/server controller printed circuit boards. And, cache memories are mounted on cache memory printed circuit boards. The disk directors, host computer/server directors, and cache memory printed circuit boards plug into the backplane printed circuit board. In order to provide data integrity in case of a failure in a director, the backplane printed circuit board has a pair of buses. One set the disk directors is connected to one bus and another set of the disk directors is connected to the other bus. Likewise, one set the host computer/server directors is connected to one bus and another set of the host computer/server directors is directors connected to the other bus. The cache memories are connected to both buses. Each one of the buses provides data, address and control information.

The arrangement is shown schematically in FIG. 1 of U.S. Pat. No. 6,636,933, entitled "Data Storage System Having Crossbar Switch With Multi-Staged Routing," issued Oct. 21, 2003, and assigned to the same assignee as the present invention (hereinafter, the "'933 patent"), which patent is incorporated herein in its entirety. Thus, the use of two buses B1, B2 provides a degree of redundancy to protect against a total system failure in the event that the controllers or disk drives connected to one bus, fail. Further, the use of two buses increases the data transfer bandwidth of the system compared to a system having a single bus. Thus, in operation, when the host computer/server 12 wishes to store data, the host computer 12 issues a write request to one of the front-end directors 14 (i.e., host computer/server directors) to perform a write command. One of the front-end directors 14 replies to the request and asks the host computer 12 for the data. After the request has passed to the requesting one of the front-end directors 14, the director 14 determines the size of the data and reserves space in the cache memory 18 to store the request. The front-end director 14 then produces control signals on one of the address memory busses B1, B2 connected to such front-end director 14 to enable the transfer to the cache memory 18. The host computer/server 12 then transfers the data to the front-end director 14. The front-end director 14 then advises the host computer/server 12 that the transfer is complete. The front-end director 14 looks up in a Table, not shown, stored in the cache memory 18 to determine which one of the back-end directors 20 (i.e., disk directors) is to handle this request. The Table maps the host computer/server 12 addresses into an address in the bank 14 of disk drives. The front-end director 14 then puts a notification in a "mail box"

(not shown and stored in the cache memory 18) for the back-end director 20, which is to handle the request, the amount of the data and the disk address for the data. Other back-end directors 20 poll the cache memory 18 when they are idle to check their "mail boxes". If the polled "mail box" indicates a transfer is to be made, the back-end director 20 processes the request, addresses the disk drive in the bank 22, reads the data from the cache memory 18 and writes it into the addresses of a disk drive in the bank 22.

Further described in the '933 patent is the use of a crossbar switch for connecting the data pipe of each director to the cache memory. As shown in FIGS. 8A and 8B, particularly, each crossbar switch device 318 is coupled to an associated data pipe 180, which is part of the upper machine of the system (not shown), on its respective director board. The crossbar switch receives data read and write commands from the host 121 through the data pipe 180. Based on the type of command and the destination of the read/write instructions, the crossbar switch directs the command and data, if the command is a write command to the appropriate cache memory board via the appropriate output port of the crossbar switch. Each output port of the crossbar switch is coupled to a logic network 221, or region controller, on the memory board 220. The region controller operates to transmit commands received from the crossbar switch to the appropriate memory array on the memory board 220.

SUMMARY OF THE INVENTION

The present invention is directed to the notification of errors on the link between the crossbar switch and the region controller. In the system described in the '939 patent, the link that couples the crossbar switch to the region controller is a parallel link. With a parallel link, errors are relatively infrequent, but can be fatal when they do occur. In such an instance, a notification of the error is transmitted to the host from the crossbar switch, and the error is handled by the host, which may initiate a reinitialization of the link.

In the present invention, in order to increase the bandwidth of the link between the crossbar switch and the region controller, the parallel link has been replaced by a high-speed serial link. While the serial link increases the throughput of the system, transmission errors on the serial link are more frequent. However, these errors are typically "soft" errors, meaning that they are not fatal and can be compensated for through a retry operation by the upper machine of the director. Only the crossbar switch is capable of transmitting a status message to the upper machine indicating the occurrence of errors and initiating a retry operation by the upper machine. The upper machine is not aware of the status of the serial link between the crossbar switch and the region controller. Therefore, when an error occurs on the serial link between the crossbar switch and the region controller, the crossbar switch must provide the appropriate status message to the upper machine indicating the occurrence of the a link error and initiating a retry operation by the upper machine. The upper machine will treat the status message from the crossbar switch as if it were a notification of an error in the link between the upper machine and the crossbar switch, and will initiate the retry operation.

BRIEF DESCRIPTION OF THE DRAWINGS

These and other features of the invention will become more readily apparent from the following detailed description when read together with the accompanying drawings, in which.

DETAILED DESCRIPTION

Figure 1:
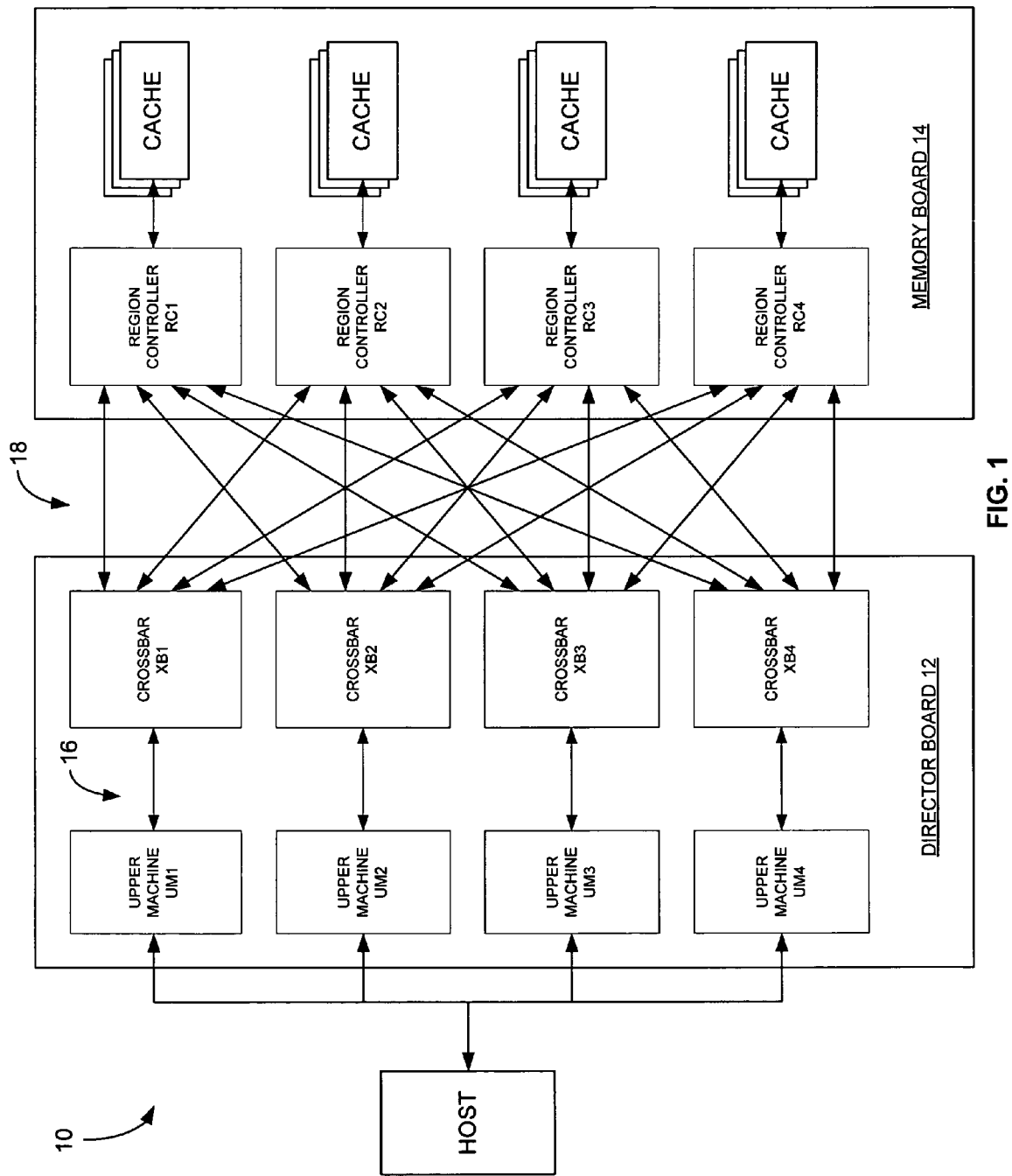
FIG. 1 is a schematic block diagram of the director board and the memory board which utilizes the error notification and forced retry operation in accordance with the present invention.

FIG. 1 is a schematic block diagram of the data command transmission system 10 of the present invention. As shown in the figure, the system 10 includes a director board 12 and a memory board 14. Similar to the system of the '933 patent, director board 12 includes upper machines UM1, UM2, UM3 and UM4 that are coupled to crossbar switches XB1, XB2, XB3 and XB4, respectively, via UM/XB link 16. Memory board 14 includes region controllers RC1, RC2, RC3 and RC4, each of which being coupled to a respective cache region. Each of the crossbar switches XB1, XB2, XB3 and XB4 are coupled to each of the region controllers RC1, RC2, RC3 and RC4 via XB/RC link 18. The director board 12 of system 10 may be either a front-end director board or a back-end director board.

In operation, the host will send a read or write command to one of the upper machines UM1, UM2, UM3 and UM4, which will transmit the command to its associated crossbar via the UM/XB link 16. The crossbar will route the command to the appropriate region controller via the XB/RC link 18. The region controller, based on the type of command and address associated with the command, will then either read data from one of the cache regions, in the case of a read command, or write data to one of the cache regions, in the case of a write command. When the transaction is completed, i.e., the data intended to be read has been read or the data intended to be written has been written, the crossbar will send a status signal to the upper machine to signify the completion of the transaction. As is described in more detail below, the upper machine stores each command in a retry mechanism buffer until the status signal received from the crossbar signifies the completion of the transaction. If the status signal transmitted from the crossbar to the upper machine indicates that an error in the transaction has occurred, the upper machine will retry the transaction by retransmitting the command to the crossbar.

Figure 2:
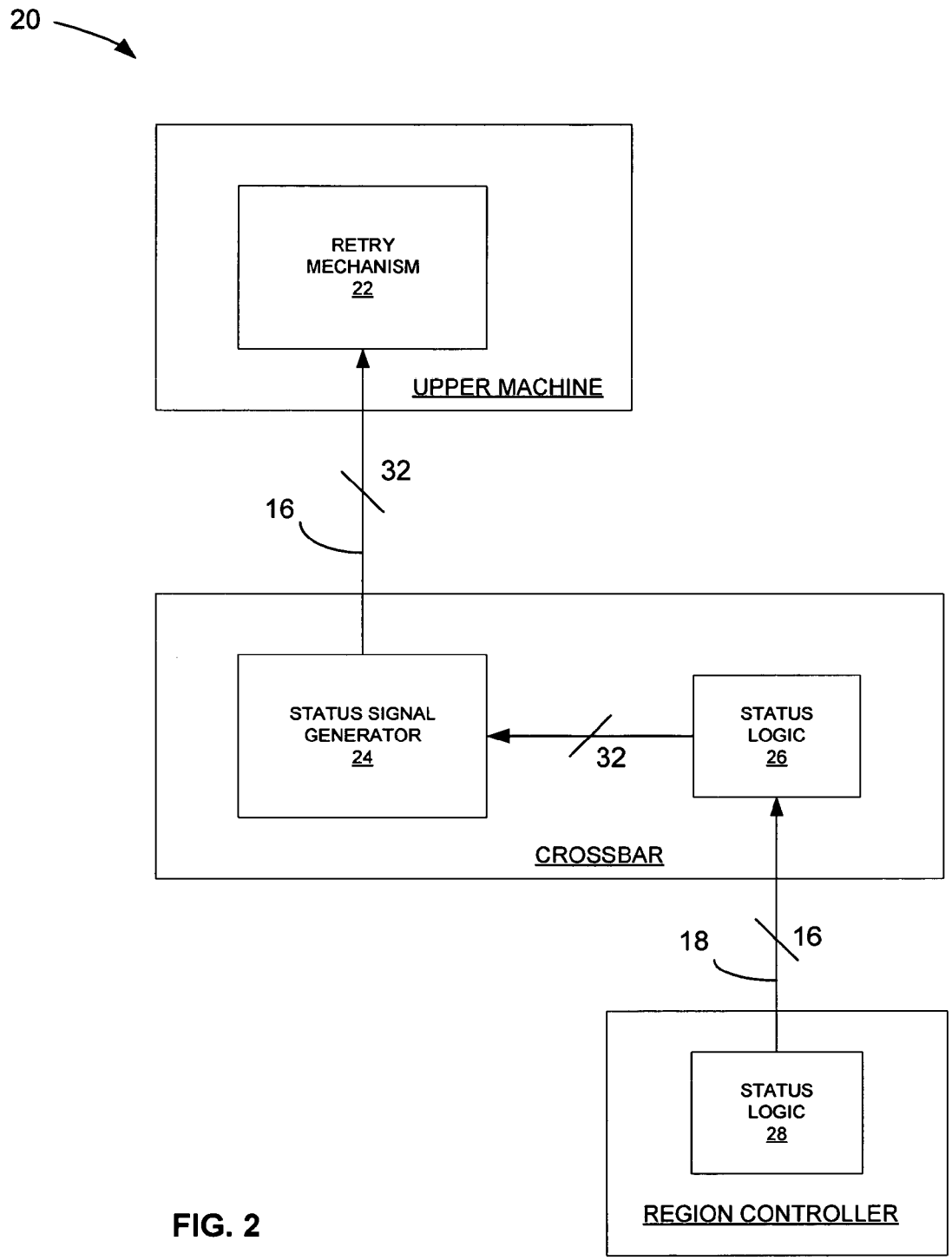
FIG. 2 is a schematic block diagram of the status signal generating logic for notifying the upper machine of errors in the transactions between the upper machine and the crossbar and between the crossbar and the region controller in accordance with the present invention.

FIG. 2 is a schematic block diagram showing the status signal generation and command transmission retry system for each set of an upper machine, crossbar switch and region controller of the present invention. As shown in the figure, each upper machine includes a retry mechanism 22 which stores each command received from the host prior to the upper machine transmitting the command to the crossbar switch. Each crossbar switch includes a status signal generator 24 and status logic 26, and each region controller includes status logic 28.

In the preferred embodiment of the invention, the status signal generated by the crossbar switch is a 32-bit word. As is described in detail below, bits 31-16 indicate a status of the transaction as reported by the region controller and bits 15-0 indicate a status of the transaction as reported by the crossbar switch. Upon the completion of a successful command transmission from the host to the appropriate cache region, the region controller status logic 28 instructs the status logic 26 of the crossbar switch to set a "success" bit, which is preferably bit 31 in the status signal. Bits 30-16 are reserved for reporting various errors that may occur during the command transmission. In particular, bits 18, 17 and 16 are reserved for reporting errors in the transmission of the command over the XB/RC link 18. Bits 15-0 of the status signal each indicate, when set, a different type of error that can occur in the crossbar switch during the transaction.

Once the status logic 26 of the crossbar switch receives the status report from the status logic 28 of the region controller, the status logic 26 instructs the status signal generator 24 to set the appropriate bits 15-0 to indicate the status of the transaction. In the case of a successful transaction, in one embodiment of the invention, none of bits 15-0 are set, and the status signal generated by the status signal generator are transmitted to the upper machine to indicate a completed transaction. Upon the receipt of the success status signal, the upper machine releases the command from the retry mechanism 22 and proceeds to process the next command from the host.

During the transmission of a command from the host to a cache region, errors can occur on either of the UM/XB link 16 or the XB/RC link 18. In the case of an error on the UM/XB link 16, the status logic 24 of the crossbar switch will instruct the status signal generator 24 to set an appropriate bit in the status signal which will notify the upper machine of the error and instruct the retry mechanism 22 to retransmit the command. In one embodiment of the invention, bit 5 is used for this purpose.

As described above, the upper machine has no direct access to the status of transmission over the XB/RC link 18. Therefore, when an error occurs on the XB/RC link 18, the upper machine must be made aware of the error so that the retry mechanism 22 can retransmit the command. Since the crossbar switch has a mechanism for notifying the upper machine of errors on the UM/XB link 16 and initiating a retry, the present invention utilizes this mechanism for initiating retry operations in the case of a XB/RC link error.

As described above, after each transaction, a status signal is generated in the status signal generator 24 to notify the upper machine whether the transaction was successfully completed. If an error occurs on the XB/RC link 18 that can be remedied by the retransmission of the command, the status logic 28 of the region controller will instruct the status logic 26 of the crossbar switch to set certain bits of the status signal, depending on the type of error that has occurred. In one embodiment of the invention, bit 18 is set to indicate a XB/RC link interface error, bit 17 is set to indicate a XB/RC link address/command CRC error and bit 16 is set to indicate a XB/RC link data CRC error. In any event, when the status logic 26 of the crossbar switch receives instructions from the status logic 28 of the region controller to set one of these bits, the status logic 26 instructs the status signal generator 24 to set the appropriate bit, i.e., bit 5, in the status signal, which will notify the upper machine of an error that requires that the retry mechanism 22 retransmit the command.

Figure 3:
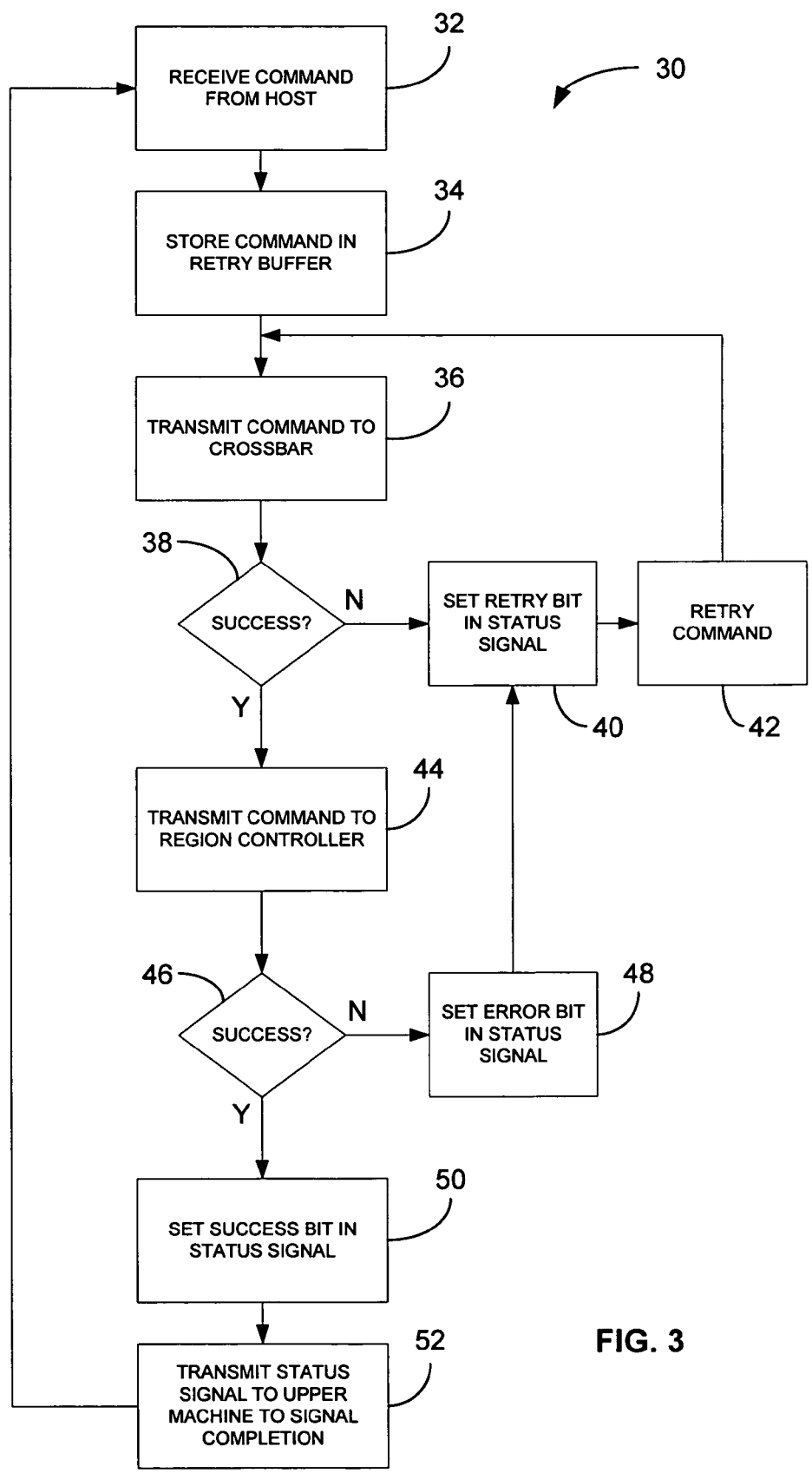
FIG. 3 is a flow diagram showing the steps involved in the error notification and forced retry operation in accordance with the present invention.

FIG. 3 is a flow diagram 30 showing the steps involved in the method of error notification and forced retry in accordance with the present invention. In Step 32, the upper machine receives a command from the host. The command may be either a read command or a write command. Upon receiving the command from the host, the upper machine stores the command in a retry buffer in the retry mechanism 22, Step 34. The upper machine then transmits the command to the crossbar switch over the UM/XB link 16, Step 36. If that transmission is successful, Step 38, the crossbar switch transmits the command to the region controller over the XB/RC link 18, Step 44. If the transmission of the command over the XB/RC link 18 is successful, Step 46, the status logic 28 of the region controller instructs the status logic 26 of the crossbar switch to set the success bit, i.e., bit 31 of the status signal, Step 50. A status signal is then generated in the status signal generator 24 which indicates that the transaction is completed, and the status signal is transmitted to the upper machine, Step 52, to instruct the retry mechanism 22 to release the command stored therein. The process then returns to Step 32, and the upper machine receives the next command from the host.

If, in Step 38, the crossbar determines that an error has occurred over the UM/XB link 16 and the transaction was not successful, the status logic 26 instructs the status signal generator 24 to set the retry bit, i.e., bit 5, of the status signal, Step 40. The status signal is transmitted to the retry mechanism 22 of the upper machine to instruct the upper machine to retry the transaction, Step 42. Upon receiving the status signal indicating a retry command, the retry mechanism transmits the command stored in the retry buffer to the crossbar switch over UM/XB link 16, Step 36.

If, in Step 46, the region controller determines that an error has occurred over the XB/RC link 18 and the transaction was not successful, the status logic 28 instructs the status logic 26 to set an error bit, i.e., bit 18, 17 or 16, in the status signal, Step 48. However, in order for the crossbar switch to instruct the upper machine to retry the transaction, when the status logic 26 receives the instruction from the status logic 28 to set the error bits 18, 17 or 16, the status logic 26 instructs the status signal generator 24 to set the retry bit, i.e. bit 5, Step 40. The status signal is then transmitted to the retry mechanism 22 of the upper machine to instruct the upper machine to retry the transaction, Step 42. Upon receiving the status signal indicating a retry command, the retry mechanism 22 transmits the command stored in the retry buffer to the crossbar switch over UM/XB link 16, Step 36.

Accordingly, the present invention utilizes logic in the crossbar switch to instruct the upper machine to retry a transaction for errors occurring on both the UM/XB link 16 and the XB/RC link 18. This enables the system 10 to address both types of link errors without changing the logic structure of the upper machine or requiring the host to reinitialize the links when these errors occur, particularly on the XB/RC link 18.

The system and method described herein may find applicability in any computing or processing environment. The system and method may be implemented in hardware, software, or a combination of the two. For example, the system and method may be implemented using circuitry, such as one or more of programmable logic (e.g., an ASIC), logic gates, a processor, and a memory.

The system and method may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system and method. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system and method also may be implemented as a machine-readable storage medium, configured with a computer program, where, upon execution, instructions in the computer program cause a machine to operate to perform the functions of the system and method described above.

Implementations of the system and method may be used in a variety of applications. Although the system and method is not limited in this respect, the system and method may be implemented with memory devices in microcontrollers, general-purpose microprocessors, digital signal processors (DSPs), reduced instruction-set computing (RISC), and complex instruction-set computing (CISC), among other electronic components.

Implementations of the system and method may also use integrated circuit blocks referred to as main memory, cache memory, or other types of memory that store electronic instructions to be executed by a microprocessor or store data that may be used in arithmetic operations.

The invention may be embodied in other specific forms without departing from the spirit or essential characteristics thereof. For example, although specific bit numbers in the status signal have been indicated as specifying certain errors, it will be understood that any of the bits in the status signal may be used to indicate any type of error. Furthermore, the status signal may a length other than 32 bits. Furthermore, although the invention has been described to indicate that errors in the UM/XB link are detected by the crossbar and reported to the upper machine, it will be understood that some errors in the UM/XB link are detectable by the upper machine, which can then initiate the retry. Likewise, although the invention has been described to indicate that errors in the XB/RC link are detected by the region controller and reported to the crossbar, it will be understood that some errors in the XB/RC link are detectable by the crossbar, which will send the retry command to the upper machine. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A data transmission system comprising:
   a first data transmission device;
   a second data transmission device; and
   a crossbar device for receiving commands from the first data transmission device over a first link and transmitting the commands to the second data transmission device over a second link, the crossbar device including status logic to detect a command transmission error on the first link from the first data transmission device and to transmit a retry command to prompt the first data transmission device to retry the transmission of the command over the first link; and
   wherein the second data transmission device reports a transmission error on the second link to the status logic of the crossbar device and the status logic of the crossbar device transmits the retry command to prompt the first data transmission device to retry the transmission of the command over the first link.

2. The system of claim 1 wherein the first data transmission device includes a retry mechanism for receiving the retry command from the crossbar device and retrying the transmission of the command affected by the transmission error.

3. The system of claim 2 wherein the second data transmission device includes status logic to detect a command transmission error on the second link from the crossbar device and to report the command transmission error on the second link to the status logic of the crossbar device.

4. The system of claim 3 wherein the status logic of the second data transmission device utilizes a first number of bits of an N-bit status signal to report the command transmission error on the second link to the status logic of the crossbar device.

5. The system of claim 4 wherein the status logic of the crossbar device utilizes a second number of bits of the N-bit status signal to transmit the retry command to prompt the first data transmission device to retry the transmission of the command over the first link.

6. The system of claim 5 wherein the status logic of the crossbar device sets the second number of bits based on a state of the first number of bits.

7. The system of claim 6 wherein the status logic of the crossbar device sets the first number of bits to zero after setting the second number of bits.

8. The system of claim 5 wherein the second number of bits is a single bit.

9. A data transmission system comprising:
   a first data transmission device including a retry mechanism;
   a second data transmission device; and
   a crossbar device for receiving commands from the first data transmission device over a first link and transmitting the commands to the second data transmission device over a second link, the crossbar device including status logic to detect a command transmission error on the first link from the first data transmission device and to generate a retry command to instruct the retry mechanism of the first data transmission device to retry the transmission of the command over the first link; and
   wherein the second data transmission device includes status logic to detect a command transmission error on the second link from the crossbar device and to report the command transmission error on the second link to the status logic of the crossbar device and the status logic of the crossbar device generates the retry command to prompt the first data transmission device to retry the transmission of the command over the first link.

10. The system of claim 9 wherein the status logic of the second data transmission device utilizes a first number of bits of an N-bit status signal to report the command transmission error on the second link to the status logic of the crossbar device.

11. The system of claim 10 wherein the status logic of the crossbar device utilizes a second number of bits of the N-bit status signal to transmit the retry command to prompt the first data transmission device to retry the transmission of the command over the first link.

12. The system of claim 11 wherein the status logic of the crossbar device sets the second number of bits based on a state of the first number of bits.

13. The system of claim 12 wherein the status logic of the crossbar device sets the first number of bits to zero after setting the second number of bits.

14. The system of claim 11 wherein the second number of bits is a single bit.

15. A data transmission method comprising:
   A. receiving a command from a host at a first data transmission device;
   B. transmitting the command to a second data transmission device over a first link;
   C. if the transmission from the first data transmission device to the second data transmission device over the first link is not successful, transmitting a retry command from the second data transmission device to the first data transmission device over the first link to instruct the first data transmission device to retry the transmission of the command to "the second data transmission device over the first link; the second data transmission device being a crossbar device;"

D. if the transmission from the first data transmission device to the second data transmission device over the first link is successful, transmitting the command from the second data transmission device to a third data transmission device over a second link;

E. if the transmission from the second data transmission device to the third data transmission device over the second link is not successful, transmitting an error message from the third data transmission device to the second data transmission device over the second link to instruct the second data transmission device to transmit the retry command to the first data transmission device over the first link;

F. if the transmission from the second data transmission device to the first data transmission device over the first link is successful, transmitting the command from the third data transmission device to a downstream device.

16. The method of claim 15 wherein, in Step E, the third data transmission device utilizes a first number of bits of an N-bit status signal to transmit the error message from the third data transmission device to the second data transmission device over the second link to instruct the second data transmission device to transmit the retry command to the first data transmission device over the first link.

17. The method of claim 16 wherein the second data transmission device utilizes a second number of bits of the N-bit status signal to transmit the retry command from the second data transmission device to the first data transmission device over the first link to instruct the first data transmission device to retry the transmission of the command to the second data transmission device over the first link.

18. The system of claim 17 wherein the second data transmission device sets the second number of bits based on a state of the first number of bits.

19. The system of claim 18 wherein the second data transmission device sets the first number of bits to zero after setting the second number of bits.

20. The system of claim 17 wherein the second number of bits is a single bit.

* * * * *